United States Patent

[11] 3,614,317

[72] Inventors Paul Benowitz
Freehold;
Heinz Kahlbrock, Edison, both of N.J.

[21] Appl. No. 836,732
[22] Filed June 26, 1969
[45] Patented Oct. 19, 1971
[73] Assignee Bell Telephone Laboratories, Incorporated
Murray Hill, N.J.

[54] THREE-STATE FREQUENCY SHIFT SIGNAL RECEIVER
13 Claims, 3 Drawing Figs.

[52] U.S. Cl. .......... 178/66, 325/320, 325/322, 325/323, 325/348, 325/395, 325/402, 325/403, 325/478
[51] Int. Cl. .......... H04l 27/00, H04b 1/16
[50] Field of Search .......... 178/66, 88; 331/179; 325/322, 324, 348, 395, 402, 403, 408–410, 478, 30, 320

[56] References Cited
UNITED STATES PATENTS

| | | | |
|---|---|---|---|
| 3,317,670 | 5/1967 | Doktor .......... | 178/66 |
| 3,413,556 | 11/1968 | King .......... | 325/320 |

*Primary Examiner*—Robert L. Griffin
*Assistant Examiner*—Albert J. Mayer
*Attorneys*—R. J. Guenther and Kenneth B. Hamlin ABSTRACT: A center frequency region in the signal channel band is assigned to supervisory (on-hook) signals and an upper and a lower frequency region is assigned to (mark and space) data signals whereby a greater frequency swing for increased power and bandwidth is obtained for the data signals. When incoming signals are in the center frequency region, the data signal output is blocked. Normal data signals, however, sweep through the center frequency region when a signal transition occurs. The data signal is delayed so that the delayed signal transition appears in the output after the blockage terminates.

INVENTORS P. BENOWITZ
H. KAHLBROCK
BY R C Lipton
ATTORNEY

THREE-STATE FREQUENCY SHIFT SIGNAL RECEIVER

FIELD OF THE INVENTION

This invention relates to a three-state data signaling system and, more particularly, to a receiver for binary data signals from a frequency shift signaling channel which includes a frequency region assigned to each signaling state of the binary data and a third frequency region assigned to supervisory signals.

DESCRIPTION OF THE PRIOR ART

In frequency shift signaling systems, binary data is customarily represented by an assigned frequency within the signaling channel band for each state of the data signal. The several signal frequencies are passed through a channel filter to a demodulator which converts each incoming signal frequency to a corresponding DC amplitude level to recover the baseband data signals. A square wave signal is then developed form the baseband signal by a data slicing circuit, for example, which produces signal wave transitions each time the amplitude of the baseband signal passes through a midpoint slicing level.

It is sometimes desirable to send, in addition to the binary data, a supervisory signal, such as an "on-hook" signal, that would inform the receiver that the sending station is not transmitting binary data. In frequency shift signaling the supervisory signal is conventionally assigned a frequency in a region that is above or below the binary data signal frequencies, but still within the signaling channel band to permit the signal to pass through the channel filter.

The placement of the supervisory signal frequency in a frequency region that is above or below the regions assigned to the data signals has a disadvantage in that the frequency swing between the states (mark and space) of the data signal must be reduced, decreasing in turn the bandwidth and the signal to noise ratio. In addition, some distortion (from lack of symmetry) results when the mark (or space) frequency is in the middle of the pass band of the channel filter while the space (or mark) frequency is in the upper or lower portion of the pass band. It would, therefore, be advantageous to assign the mark (or space) frequency to the upper frequency region of the pass band and to assign the space (or mark) frequency to the lower frequency region to thereby obtain symmetry and a maximum frequency swing between the mark and space signals. In this event, the supervisory signal would necessarily be assigned a center frequency region. When a data signal transition occurs, however, the signal frequency must sweep through the center frequency region for a limited interval. In addition, the midpoint slicing level of the data signal will correspond to a frequency in the center frequency region. The baseband supervisory signal may therefore periodically cross the slicing level to simulate data signal transitions.

Accordingly, it is a broad object of this invention to discriminate between data signal transitions and simulated transitions produced by supervisory signals.

SUMMARY OF THE INVENTION

The present invention is based on a system wherein the signal frequency of the data signal is normally in either the upper or lower frequency region of the pass band and sweeps through a supervisory signal center frequency region for a limited interval when the signal transition occurs. However, the duration of the supervisory signal is fixed to exceed the duration of the limited interval. In accordance therewith, the data receiver of the present invention is arranged to pass the data signal transition so long as the signal frequency does not stay in the center frequency region longer than the limited interval and to squelch the passage of signal transitions (which may be due to noise or due to the supervisory signal periodically crossing the data slicing level) when the signal frequency remains in the center frequency region longer than the limited interval.

Squelching of signal transition derived from frequency shift signals which are not within a signal band or baseband signals not within threshold amplitudes have been known in the past. These squelching circuits either squelch the signal as soon as it leaves the permissible limits or, alternatively, after having left the limits for a predetermined interval of time. However, when data signals are being received, immediate squelching masks the crossing of the data signal through the slicing level and thus distorts the data signal by modifying the phase of the transition and, when supervisory signals are being received, delayed squelching permits simulated signal transitions to pass for the interval of time corresponding to the delay.

It is therefore a more specific object of this invention to squelch nondata signals without distorting the data signals and without passing limited intervals of simulated signals.

It is a feature of this invention that the data receiver delays the passage of the data signal transition, after reception thereof, for a sufficient duration to permit squelching to terminate. More specifically, the signals are delayed for at least the limited interval before their passage or their squelch, whichever the case may be. This permits immediate squelching (to block any simulated signal transitions if the center frequency signal is the initial portion of the on-hook signal or noise) and precludes distortion since the signal transition is not masked.

It is another feature of this invention that the squelching circuit operates to squelch the passage of the signal transition by clamping the output (passed) signal in one state such as the marking condition. When the delayed signal is marking and the clamping starts, the output signal is maintained marking until clamping terminates. Since, during normal data signaling, the clamping terminates before the delayed signal transition is passed to the data receiver output, the terminal portion of the marking signal is therefore not distorted.

In accordance with the illustrative embodiment of this invention, the squelching circuit includes a center frequency detector which examines the baseband signal to determine if the incoming signal frequency is within the center frequency region. The detector operates when the baseband signal amplitude is lower than an upper threshold amplitude level (which corresponds to the highest frequency in the center frequency region) and higher than a lower threshold amplitude level (which corresponds to the lowest frequency in the center frequency region) to indicate that the incoming signal frequency is in the center frequency region.

It is a further feature of this invention that the squelching circuit is locked into the operated state when the incoming signal frequency is continuously in the center frequency region for a predetermined duration of time substantially greater than the limited interval. This signal is interpreted as the "on-hook" signal and the data receiver, in response thereto, applies a permanent squelch to the output signals. This squelch is maintained until an "off-hook" signal is received, which signal preferably comprises a continuous signal frequency in the upper frequency region, whereupon the squelching circuit is unlocked.

The foregoing and other objects and features of this invention will be fully understood from the following detailed description of an illustrative embodiment thereof taken in conjunction with the accompanying drawings.

DETAILED DESCRIPTION

Figure 1:
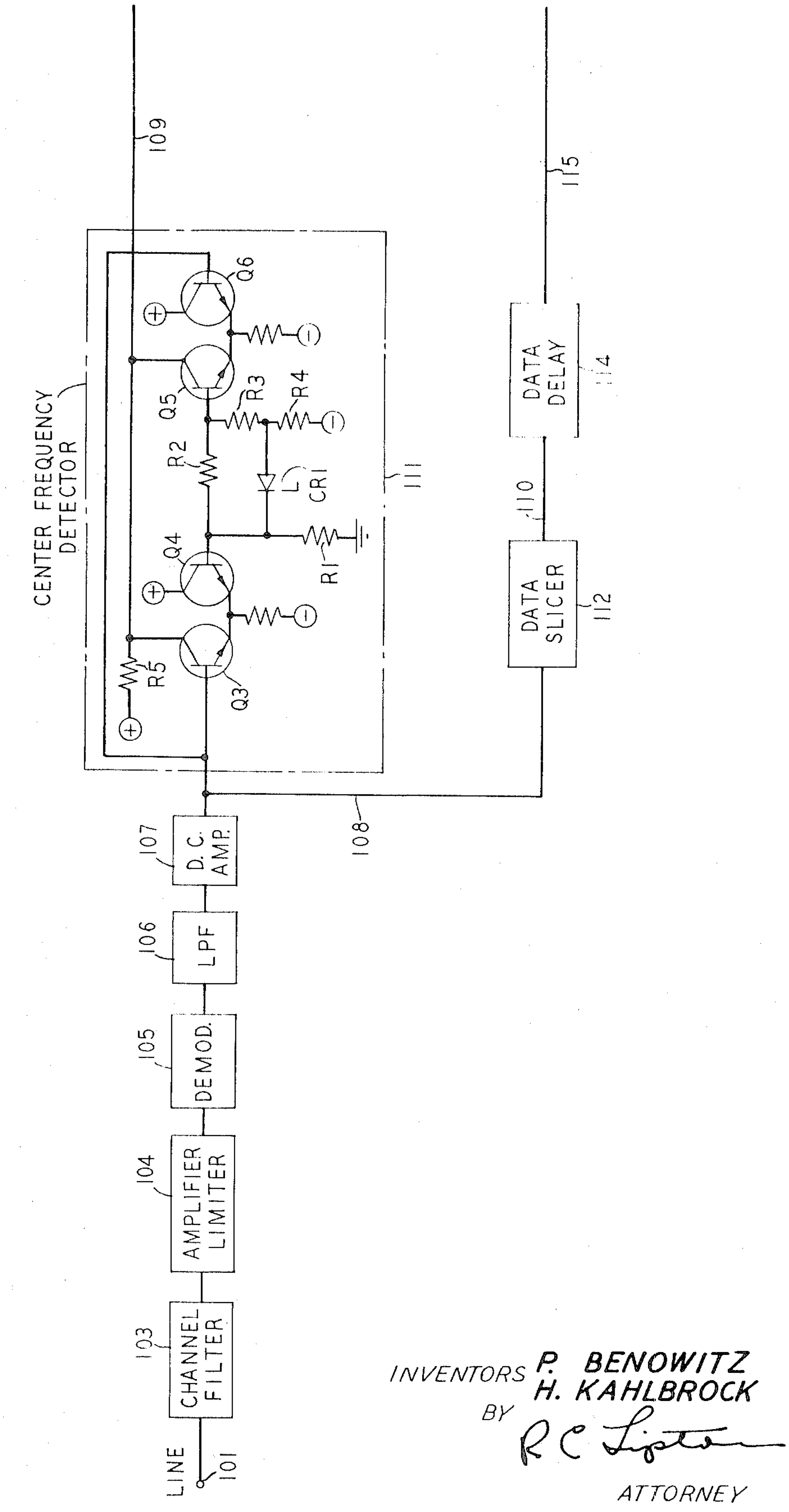
FIGS. 1 and 2 which, when arranged side by side, disclose in schematic form the circuits and equipment of a data receiver of three-state frequency shift signals in accordance with this invention.

Referring now to FIG. 1, the incoming signals are received on line 101. These signals comprise frequency shift signals which include mark and space frequencies and intermediate frequency supervisory signals. Specifically, an upper frequency region designates marking signals and a lower frequency region indicates spacing signals while the supervisory signals occupy a center frequency region or band which is between the upper mark and the lower space frequency regions. In accordance with the present arrangement, a signal within one of the above-described bands is always being received. That is, the received signal is, in all events, either a mark or space frequency signal or, alternatively, a center frequency region supervisory signal.

The incoming signal frequencies are applied to a channel filter, generally indicated by block 103. Channel filter 103 filters out the signals in the channel and passes the signals on to amplifier limiter 104. The signals are therefore amplified and the limiting action operates to square up the signal wave to remove amplitude modulations and noise. This squared-up signal is then passed to demodulator 105, which recovers the baseband direct-current signal. Low-pass filter 106 then eliminates the high frequency components of the baseband signal and passes the signal to DC amplifier 107, which develops an amplified DC baseband signal on lead 108.

Figure 3:
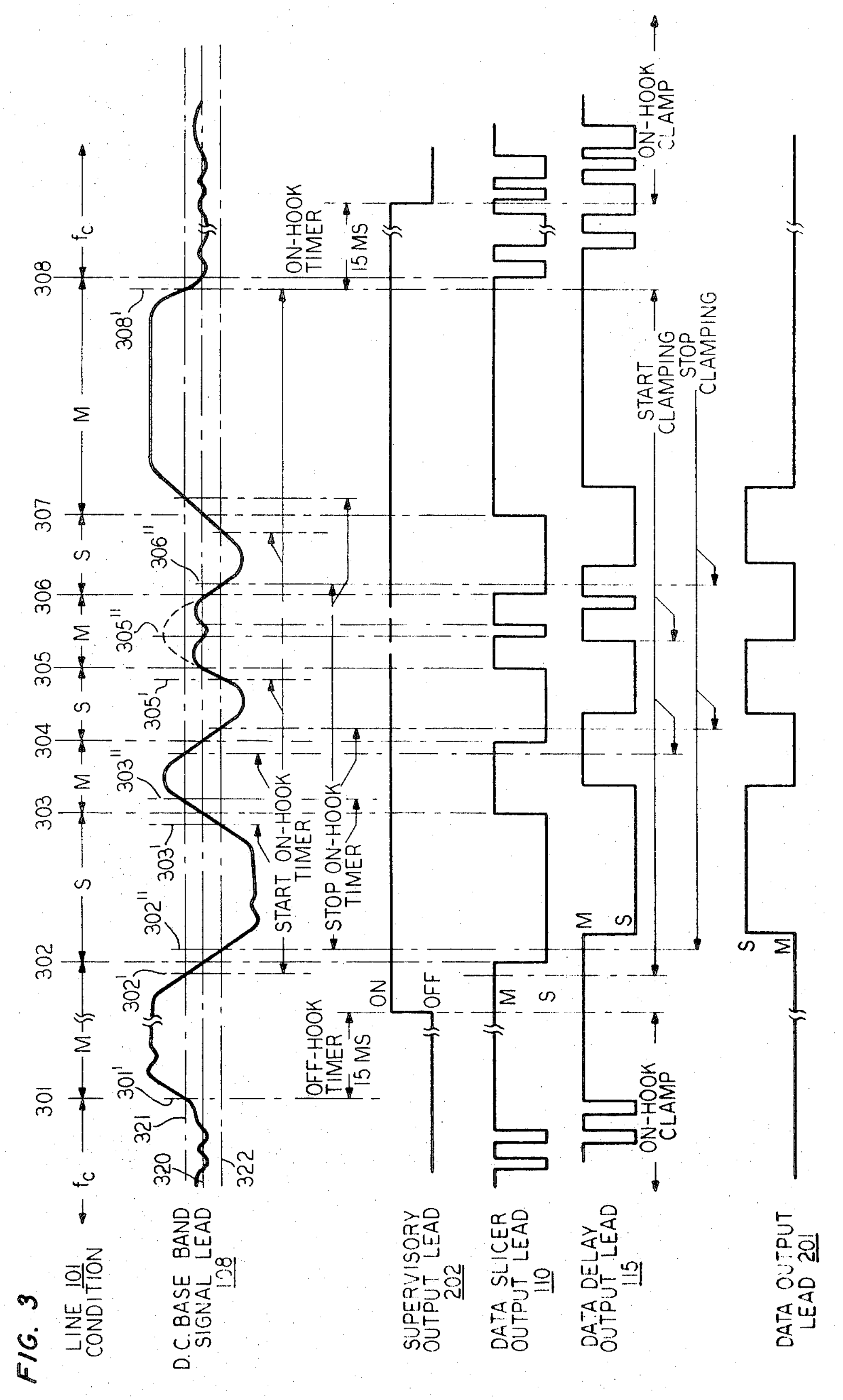
FIG. 3 shows various timing waves representing incoming and outgoing signals of the several circuits in the data receiver.

A typical timing wave on DC baseband signal lead 108 is shown in FIG. 3. Directly above the timing wave is a time interval representation of the line conditions on line 101 starting from an initial interval, prior to the time instant represented by vertical line 301, where the incoming signals all fall within the center frequency (fc) region. This indicates that the remote station is on-hook. At time instant 301 the remote station goes off-hook and preferably sends a continuous marking frequency signal (although a continuous spacing frequency signal would also indicate that the station went off-hook). This condition persists for an interval exceeding 15 milliseconds, for reasons described hereinafter. At instant 302, the remote station begins sending a spacing signal. Thereafter, starting at instants 303 through 308, alternate marking and spacing signal frequencies are transmitted. At approximately the time instant 308 the remote station goes on-hook and thereafter sends the supervisory signal frequency in the center region.

Refer now to the DC baseband signal on lead 108, shown in FIG. 3. It is seen that prior to time instant 301 while the remote station is off-hook and the supervisory center frequency is being received from line 101, the DC baseband signal amplitude varies about a midpoint "crossover" level designated as level 320 but does not go above an upper threshold level 321 or a lower threshold level 322. This indicates that the signal frequencies on line 101 are within the center frequency region. When the remote station goes off-hook the transmission of the supervisory signal frequency is terminated and, in accordance with the preferred arrangement, a marking (or idle) frequency is transmitted for an interval exceeding 15 milliseconds. Accordingly, the signal amplitude on lead 108, starting from approximately the crossover midpoint amplitude level 320, rises in a positive direction at time instant 301 and passes through upper threshold level 321 at time instant 301', thus leaving the center frequency region. Thereafter, for the marking interval, the signal on lead 108 is maintained above upper threshold level 321 until time instant 302', whereupon the signal falls back into the center frequency region. At time instant 302 the signal amplitude drops below crossover level 320 and thus becomes a negative spacing signal. This negative spacing signal then continues through lower threshold 322, leaving the center frequency region at time instant 302''. The spacing condition below the lower threshold amplitude is maintained until the spacing signal terminates, whereupon the signal again sweeps through the center frequency region, crossing the midpoint crossover to become a marking signal. The succeeding portions of the wave repeat these sequences until time instant 305. At this time it is assumed that noise has destroyed a marking pulse. The normal pulse, but for the noise, would produce a normal marking signal during the interval between time instants 305 and 306, as shown by the dotted line. The actual signal, however, at time instant 305'', instead of increasing in amplitude in a positive direction, again falls across the midpoint crossover, and then, staying in the center frequency region, proceeds to again cross the midpoint crossover level several times until time instant 306, whereupon a spacing pulse, free of noise, is received and the signal amplitude negatively increases in a normal manner. The DC baseband signal on lead 108 goes back into the center frequency region after time instant 308 since the remote station has gone on-hook. Due to line conditions, this signal may cross the midpoint crossover level several times, although staying in the center frequency region.

The direct-current baseband signal on lead 108 is passed to a center frequency detector, generally indicated by block 111, and, in parallel, to data slicer 112. Data slicer 112 is a conventional slicer circuit which slices the DC signal at the midpoint crossover amplitude level. The output of data slicer 112 on lead 110 constitutes a square wave whose transitions occur when the amplitude of the DC baseband signal on lead 108 passes through the crossover level. Specifically, the square wave output of data slicer 112 is positive when the incoming signal is marking and is negative when the incoming signal is spacing. It is noted, of course, that the data slicer output will be positive marking or negative spacing when the baseband signal amplitude is above or below the crossover level, even though the signal amplitude does not exceed the upper or lower threshold levels defining the supervisory signal frequency region.

Refer now to the timing wave of output lead 110 of data slicer 112 in FIG. 3. Prior to time instant 301, the supervisory signal is being received and the baseband signal on lead 108 varies about the crossover slicing level in the center frequency region. The wave on lead 110 is positive marking or negative spacing, depending on whether the baseband signal on lead 108 is above or below crossover slicing level 320. Thus, the wave on lead 110 develops simulated mark and space pulses while the supervisory on-hook signal is being received.

At instant 301 the baseband signal rises above the slicing level, whereupon the output of data slicer 112 goes marking, which condition persists until time instant 302. At time instant 302 the wave on lead 108 crosses below the slicing level, whereupon the wave on output lead 110 drops to spacing. Accordingly, the output of data slicer 112 follows the baseband signal on lead 108 each time the baseband output passes through crossover slicing level 320. It is noted that between time instants 305 and 306 the wave on lead 110 goes alternately marking and spacing since the baseband signal on lead 108 passes through the crossover slicing level a plurality of times because of noise. Finally, it is seen that after time instant 308, when the remote station goes on-hook and again sends the supervisory signal frequency in the center region, the output of data slicer 112 simulates marking and spacing pulses as the baseband signal on lead 108 crosses the slicing level a plurality of times.

The data slicer 112 output on lead 110 is passed to a data delay circuit, generally indicated by block 114. Data delay circuit 114 is arranged to delay both the negative and positive transitions of the data slicer output signal by a fixed interval. Preferably, this delay is fixed to be at least as long as the time it normally takes the frequency shift signal on lead 101 to sweep through the center frequency region as the signal goes from the marking frequency to the spacing frequency or vice versa, for reasons described in detail hereinafter. Accordingly, data delay circuits 114 provides a delayed version of the output signal of data slicer 112 to output lead 115 as seen in FIG. 3. This delayed signal is passed by way of lead 115 to a clamping circuit, generally indicated by block 204 in FIG. 2.

Returning now to the DC baseband signal on lead 108, it is recalled that, in addition to being applied to data slicer 112, this signal is also applied to center frequency detector 111.

Center frequency detector 111 is arranged, as described in detail hereinafter, to examine the DC baseband signal and apply a relatively positive signal to lead 109 when the amplitude of the baseband signal indicates that the incoming signal frequency on lead 101 is within the center frequency region. The output signal on lead 109 is negative when a marking or spacing frequency is being received. Thus, lead 109 is positive when the supervisory signal is being received or during the interval when a data transition occurs and the incoming signal frequency on lead 101 is sweeping through the center frequency region. This signal is then passed by way of lead 109 to on-off hook timers which are generally indicated by block 203 in FIG. 2.

On-off hook timers 203 include an off-hook timer and an on-hook timer. The off-hook timer is arranged, as described in detail hereinafter, to time the continuous marking (or spacing) signal which is received when the remote station initially goes off-hook. The off-hook timer is normally initially enabled while the on-hook supervisory signal in the center frequency region is being received and starts timing upon the reception of the marking (or spacing) signal. Preferably, the off-hook timer is arranged to time out after the continuous reception of 15 milliseconds of the marking (or spacing) signal.

As previously described, lead 109 is positive when the center frequency region signal is being received and goes negative when a marking or spacing frequency is being received. During the initial on-hook condition, with lead 109 maintained positive, on-off hook timers 203 maintain output lead 209 at approximately a ground potential and output lead 208 at a positive potential. The ground on lead 209 is passed to supervisory signal output driver 205, which, in response to the ground signal, applies negative potentials to leads 202 and 210. The negative potential on lead 210 is then passed back to on-off hook timers 203 and, in addition, is applied to clamping circuit 204 to indicate that an on-hook condition exists at the remote station. The negative potential on lead 202 may be utilized to operate external indicating devices (not shown) to indicate the on-hook condition. Referring to FIG. 3, the output wave on supervisory lead 202 is shown below the DC baseband wave. It is seen that the wave on lead 202 is relatively negative during the initial interval when the supervisory signals in the center frequency region are being received.

Assume now that the remote station goes off-hook. A marking (or spacing) frequency signal outside the center frequency region is received and the potential on lead 109 goes negative. This is identified as instant 301′ in FIG. 3. The off-hook timer in timers 203 begins to time and, assuming that approximately 15 milliseconds of marking frequency is received, the timer times out and thereupon applies a negative potential to output lead 209. Supervisory signal output driver 205, in response thereto, applies positive potentials to output leads 202 and 210. The positive potential on output lead 202 is shown in FIG. 3 as immediately following a 15 millisecond timing interval. This positive potential on lead 202 may be used to indicate the external indicating devices that an off-hook condition now exists. The positive potential on lead 210 is used to indicate the off-hook condition to on-off hook timers 203 and clamping circuit 204. With respect to on-off hook timers 203, the positive potential on lead 210 operates to disable the off-hook timer. At this time the on-hook timer has been enabled and will proceed to time when the incoming signal is in the center frequency region, as described hereinafter, to time a 15 millisecond interval. Finally, on-off hook timer 203 applies a ground potential to lead 208. This indicates to clamping circuit 204 that a marking or spacing signal not in the center frequency region is being received.

The ground condition on lead 209 and the positive condition on lead 210 persists so long as the off-hook condition is maintained. With respect to the condition on lead 208, ground is maintained thereon while a marking or spacing signal outside the center frequency region is being received and a positive condition is imposed on lead 208 when a signal in the center frequency region is being received. The manner in which clamping circuit 204 utilizes this information is described in detail hereinafter.

As seen in FIG. 3, the DC baseband signal begins its transition from mark to space at time instant 302′. At this time, the on-hook timer of timers 203 begins to time and the potential on lead 208 goes positive. Thereafter, the DC baseband signal becomes spacing and, at time instant 302″, leaves the center frequency region, whereupon the on-hook timer resets and the potential on lead 208 returns to ground. This process is repeated for each baseband signal transition. It is noted that, at time instant 305′, a baseband signal transition from space to mark is initiated. This mark pulse, we have presumed, is destroyed by noise frequencies in the center frequency region, the noise subsisting at about time instant 306 when the baseband signal amplitude crosses the slicing level. Thereafter the signal increases negatively to exceed the lower threshold level at time instant 306″, whereupon the signal enters the portion of the spacing region outside the center frequency region. Accordingly, lead 208 is maintained positive between time intervals 305′ and 306″ and the on-hook timer times for this interval, resetting at time instant 306″ (since the duration of the interval is less than 15 milliseconds).

If continuous signals in the center frequency region persist for a 15 millisecond interval, it is presumed that the remote station has returned to the on-hook condition. Starting at time instant 308′, FIG. 3, the DC baseband signal amplitude drops into the range of levels corresponding to the center frequency region and lead 109 becomes positive. Timers 203 thereupon apply a positive potential to lead 208. This condition is maintained for 15 milliseconds, the on-hook timer of timers 203 times out and lead 209 lead 209 restores to the ground potential. Supervisory signal output driver 205, in response thereto, restores lead 202 to the negative potential, indicating the restoration of the on-hook condition. Lead 210 is also restored to the negative condition. This re-enables the off-hook timer in timers 203. Finally, output lead 208 of timers 203 is maintained in the positive condition so long as the on-hook condition of the remote station persists. Clamping circuit 204, under normal conditions, is arranged to invert and pass the delayed data signals on lead 115 to data output driver 206 by way of lead 211. Alternatively, clamping circuit 204 clamps output lead 211 in a negative marking condition when lead 210 indicates an on-hook condition of the remote station and maintains this clamp until the on-hook condition is removed. Alternatively, clamping circuit 204 clamps output lead 211 in the negative marking condition when lead 208 indicates that the input signal is sweeping through the center frequency region and a delayed marking signal is concurrently being applied to clamping circuit 204 by data delay circuit 114 via lead 115 and maintains this clamp until lead 208 returns to ground to indicate that the incoming signal is no longer in the center frequency region. The function of clamping circuit 204 is therefore twofold; to clamp the data output marking when timers 203 indicate that the remote station is in an on-hook condition and to preclude the data output signal from going from marking to spacing when signals in the center frequency region are being received. The purpose of the latter function is to block, from the output, supervisory signals in the center frequency region (which simulate short mark and space pulses) received when the remote station goes back on-hook after sending data. This clamping is imposed as soon as the supervisory signals are received and does not distort normal data signaling due to the delay provided by data delay circuit 114, for reasons described hereinafter. In addition, this clamping also tends to eliminate noise signals, in the center frequency, which interfere with the incoming data.

Assume now that an on-hook condition exists. On-off hook timers 203 apply ground to lead 209 and supervisory signal output driver 205, in turn, applies a negative potential to lead 210. This negative potential is therefore applied by way of lead 210 to clamping circuit 204, which thereupon clamps a negative marking condition on output lead 211. This negative potential is passed to data output driver 206, which, in response thereto, applies a negative potential to data output lead 201, as shown in the correspondingly identified wave in FIG. 3. The negative clamped condition on output lead 201 designates a marking output signal, which is then indicative to succeeding circuits or equipment (with lead 202 negative) that an on-hook condition persists on line 101. This clamping action eliminates any simulated mark and space pulses developed on lead 115 in response to the incoming supervisory on-hook signal.

At time instant 301' the on-hook condition is removed, and fifteen milliseconds later the negative potentials on leads 202 and 210 are removed and ground is applied to lead 208, as previously described. The clamping potentials applied by leads 208 and 210 are therefore removed. At this time, however, the delayed data signal on lead 115 is marking and clamping circuit 204 thereupon inverts and passes the signal to maintain a negative marking condition on lead 211. Accordingly, data output driver 206 maintains the negative marking output on lead 201.

At time instant 302' the amplitude of the DC baseband signal on lead 108 drops below the upper threshold limit and into the center frequency region. Lead 208 now goes positive and, since the delayed signal on lead 115 is marking, a clamping condition is satisfied and clamping circuit 204 immediately clamps lead 211 in the negative marking condition. Lead 201 is thus maintained negative marking.

At the time instant 302 the DC baseband signal amplitude crosses the slicing level and the signal on lead 110 goes from marking to spacing. The signal on lead 115, however, remains marking because of the delay provided by data delay circuit 114.

At time instant 302'' the DC baseband signal amplitude exceeds (negatively) the lower threshold limit and therefore leaves the center frequency region. Lead 208 now goes to ground and the clamping condition is terminated. Thereafter, the delayed signal on lead 115 goes spacing and the inversion thereof is passed to lead 211 which, in turn, results in the application of a positive spacing signal to data output lead 201. It is to be noted that the delayed transition occurs after the DC baseband signal leaves the center frequency region and thus after the clamping condition imposed by clamping circuit 204 has been terminated. Since the instant where the slicing crossover occurs is not necessarily fixed with respect to the instants where the signal enters and leaves the center frequency region, the delay is fixed to be at least as long as the time it normally takes the baseband signal to sweep through the center frequency region. Thus, the clamping action does not distort the data signal during normal signaling conditions.

Clamping action does not normally occur on a spacing to marking transition. For example, at time instant 303' the DC baseband signal amplitude drops below the lower threshold into the center frequency region whereby lead 208 of timers 203 goes positive. Clamping does not take place, however, since the delayed data signal on lead 115 is spacing. The DC baseband signal crosses the slicing level at time instant 303 and leaves the center frequency region at time instant 303'', all before the delayed data signal on lead 115 goes marking. Clamping action, therefore, is not initiated.

As previously disclosed, the marking pulse between time instant 305 and time instant 306 is destroyed by noise. At time instant 305' the DC baseband signal enters the center frequency region; lead 208 goes positive but, since the delayed signal on lead 115 is presently spacing, the clamping condition is not satisfied. At time instant 305 the DC baseband signal amplitude crosses the slicing level and the signal on lead 110 goes from spacing to marking. Thereafter, the delayed data signal on lead 115 goes from spacing to marking, satisfying the clamping condition, whereby clamping clamping circuit 204 clamps lead 211 in the negative marking condition. Concurrent with the clamping of lead 211, data output lead 201 goes from spacing to marking.

Between time instants 305 and 306 the DC baseband signal remains in the center frequency region. At time instant 305'', however, the signal amplitude drops below the slicing level, whereby the signal on lead 110 goes from marking to spacing. The delayed signal on lead 115, after the appropriate delay, also goes from marking to spacing. However, because of the clamping condition, data output lead 201 is maintained in a negative marking condition. The DC baseband signal amplitude then increases to above the slicing level and finally drops below the slicing level at time instant 306. Thereafter, at time instant 306'', the DC baseband signal exceeds (negatively) the lower threshold limit and, therefore, goes into the spacing region outside the center frequency region. Lead 208 now goes to ground and the clamping condition is terminated. During the clamping condition, however, the simulated spacing pulse due to noise has been eliminated.

At time instant 308 the DC baseband signal, which is in the marking region, enters the center frequency region to begin the wave representing the incoming supervisory on-hook signal from the remote station. As shown in FIG. 3, although this supervisory signal remains in the center frequency region, it nevertheless crosses the slicing level at time instant 308 and recrosses the slicing level a plurality of times thereafter to simulate mark and space pulses. At time instant 308', however, the signal on lead 115 is marking and the clamping condition is satisfied. Clamping circuit 204 therefore immediately clamps lead 211 in the negative marking condition, thus maintaining lead 201 in the negative marking condition and therefore squelching the simulated data pulses derived from the supervisory signal. After 15 milliseconds in the center frequency region, the on-hook timer of timers 203 times out and lead 210 applies the on-hook clamping signal to clamping circuit 204. Accordingly, clamping circuit 204 applies the on-hook clamping condition to lead 211 and lead 201 is thereafter maintained in the negative marking condition to thereafter eliminate the simulated marking and spacing pulses.

Figure 2:
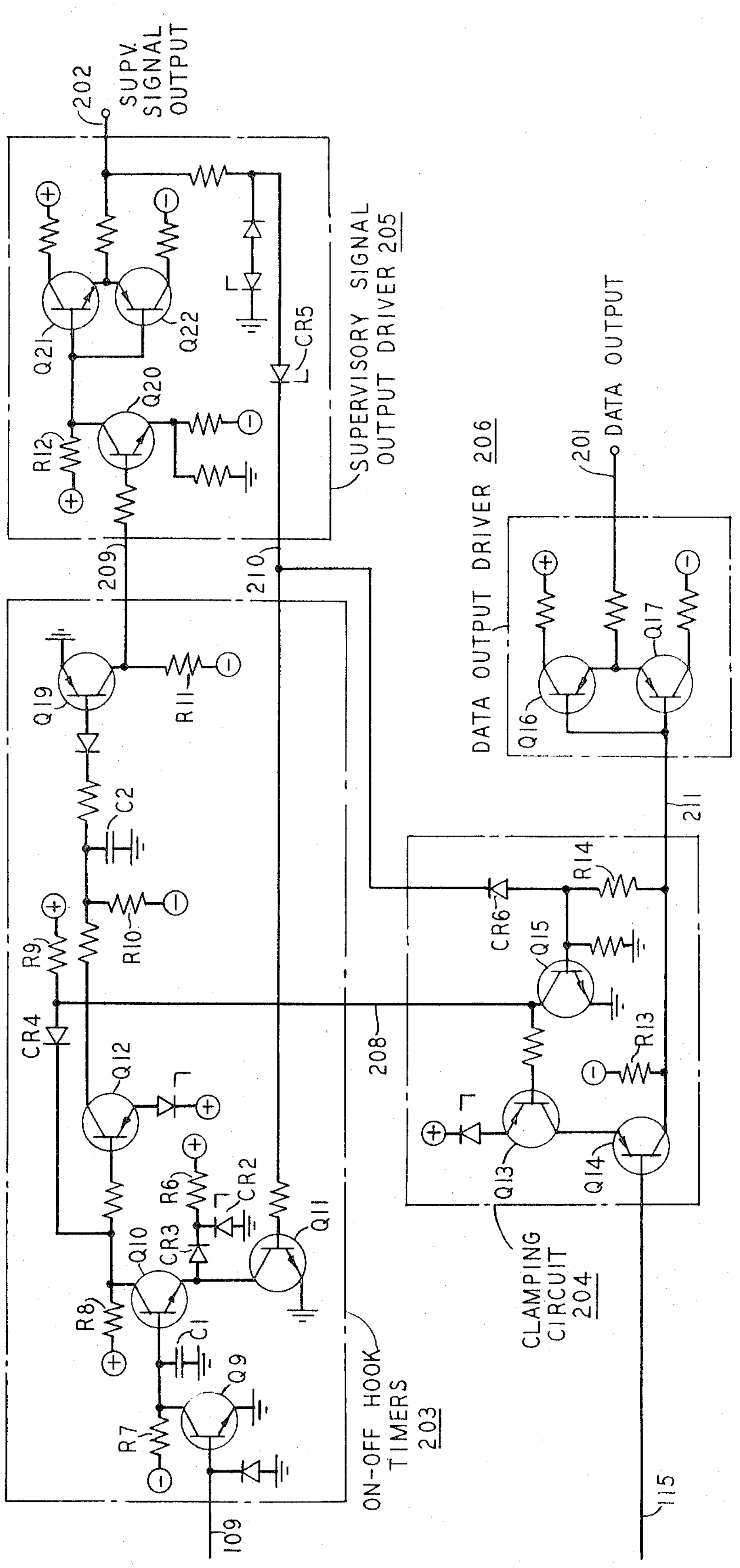

Consider now the details shown in FIG. 1 and FIG. 2. Consider first center frequency detector 111, which includes transistors Q3, Q4, Q5 and Q6. Lead 108 extends to the bases of transistors Q3 and Q6. It is recalled that the DC baseband signal amplitude on lead 108 is positive when an incoming marking signal is received and negative when an incoming spacing signal is received. The emitters of transistors Q3 and Q6 are biased to discriminate between the marking, spacing and center frequency amplitudes, as described below.

The emitter of transistor Q3 is connected to the emitter of transistor Q4. The base of transistor Q4 is connected, in turn, to a voltage divider comprising resistors R1, R2, R3 and R4 with breakdown diode CR1 connected in parallel to resistors R1 and R3. Specifically, the base of transistor Q4 is connected to the junction of resistors R1 and R2.

The emitter of transistor Q6 is connected to the emitter of transistor Q5 and the base of transistor Q5 is, in turn, connected to the junction of resistors R2 and R3. It is, therefore, seen that the base of transistor Q5 is biased negatively with respect to the base of transistor Q4. The bias applied to the base of transistor Q4 corresponds to the upper threshold amplitude and the bias on the base of transistor Q5 corresponds to the lower threshold amplitude, which amplitudes, as previously described, define the boundaries of the center frequency region. Thus, emitter follower Q4 applies a bias to the emitter of transistor Q3 corresponding to the upper threshold level and emitter follower Q5 applies a bias to the emitter of transistor Q6 corresponding to the lower threshold level.

When a marking signal is applied to lead 108 and the signal exceeds the upper threshold limit of the center frequency region it is sufficiently positive to turn ON transistor Q3 and concurrently turn ON transistor Q6. With transistor Q3 turned ON its collector potential is lowered and this negative potential is then passed to output lead 109. Accordingly, when a marking signal outside the center frequency region is applied to lead 108 a relatively negative potential is applied to lead 109.

If a spacing signal below the lower threshold level is applied to lead 108, transistors Q3 and Q6 are both turned OFF. With transistor Q6 turned OFF its emitter is rendered negative. This negative potential is more negative than the potential applied to the base of transistor Q5. Accordingly, transistor Q5 turns ON, applying a negative potential to its collector, which negative potential is passed to output lead 109. Thus, a spacing signal outside the center frequency region provides a negative potential to lead 109.

Assume now that a mark or spacing signal within the center frequency region is applied to lead 108. The level of the signal is insufficient to turn ON transistor Q3. The potential, however, exceeds the negative potential applied by transistor Q5 to the emitter of transistor Q6. Accordingly, transistor Q6 turns ON, and by its emitter follower action increases the potential on the emitter of transistor Q5. Transistor Q5 accordingly is turned OFF and, with both transistors Q3 and Q5 turned OFF, a positive potential is applied to output lead 109 by way of resistor R5. Thus, the potential on lead 109 goes positive when a signal in the center frequency region is received on lead 108 and goes negative when a marking or spacing signal outside the center frequency region is received.

The signals on lead 109, as previously described, are passed to on-off hook timers 203 and, specifically, pass to the base of transistor Q9 therein. The collector of transistor Q9 is connected to the base of transistor Q10 and to timing capacitor C1, which functions as the off-hook timing capacitor. The collector of transistor Q10 is connected to the base of transistor Q12 and the collector of transistor Q12, in turn, is connected to timing capacitor C2. Timing capacitor C2 functions as the on-hook timing capacitor.

Assume first that the remote station is on-hook and the center frequency supervisory signal is being received. Lead 109 is therefore in the positive condition and transistor Q9 is, therefore, turned ON. Ground is applied to the base of transistor Q10 and this transistor is turned OFF. With transistor Q10 turned OFF a positive potential is applied by way of resistor R8 to the base of transistor Q12 and this positive potential also back biases diode CR4. Accordingly, transistor Q12 is turned OFF and with diode CR4 back biased, a positive potential is passed by way of resistor R9 to lead 208. The turning OFF of transistor Q12 passes a negative potential through resistor R10 to the upper plate of capacitor C2, as seen in FIG. 2. This applies a negative potential to the base of transistor Q19, which thereupon turns ON. Ground is therefore applied to the collector of transistor Q19 and, therefore, to lead 209. Therefore in the initial condition, while the supervisory on-hook signal is being received, a positive potential is applied to lead 208 and ground is applied to lead 209 by on-off hook timers 203.

The ground on lead 209 is passed to the base of transistor Q20 in supervisory output driver 205. This turns the transistor ON, passing a negative potential from its collector to the bases of transistors Q21 and Q22. Transistor Q22 is therefore turned ON and by emitter follower action applies the negative signal to supervisory signal output lead 202 and, by way of breakdown diode CR5, to output lead 210. Thus, as previously described, leads 202 and 210 indicate the on-hook condition by providing negative potentials.

The negative potential is lead 210 is passed to the base of transistor Q11 in on-off hook timers 203. This turns transistor Q11 OFF during the initial on-hook condition. With transistor Q11 OFF, the emitter of transistor Q10 is connected by way of diode CR3 to the junction of resistor R6 and breakdown diode CR2. Resistor R6 and breakdown diode CR2 act as a voltage divider to provide a positive potential bias at the emitter of transistor Q10 when transistor Q11 is turned OFF.

Assume now that a continuous marking (or spacing) signal outside the center frequency region is received from the remote station to indicate that the station is off-hook. Center frequency detector 111 applies a negative potential to lead 109 in response to this continuous data signal. Accordingly, transistor Q9 turns OFF and the upper plate of capacitor C1, as seen in FIG. 2, begins to charge in a positive direction by way of resistor R7. After approximately 15 milliseconds the charge on capacitor C1 exceeds the positive potential bias of the emitter of transistor Q10 whereby the transistor turns ON. This drops the collector potential of transistor Q10 below the positive potential applied to the emitter of transistor Q12. Transistor Q12 thereupon turns ON, passing its positive emitter potential to the upper plate of capacitor C2. This removes the negative potential previously applied to the base of transistor Q19 and this latter transistor turns OFF. A negative potential is thereupon applied by way of resistor R11 to output lead 209, indicating the termination of the on-hook condition.

The negative potential on lead 209 is applied to the base of transistor Q20, turning the transistor OFF. A positive potential is therefore applied by way of resistor R12 to the bases of transistors Q21 and Q22. Transistor Q22 is now turned OFF and transistor Q21 turns ON to apply by emitter follower action the positive potential on its base to supervisory output lead 202 and by way of breakdown diode CR5 to lead 210. Supervisory output lead 202 thereby indicates the termination of the on-hook condition.

The positive potential on lead 210 is passed to the base of transistor Q11 to turn the transistor ON. The collector of transistor Q11 thereupon goes to ground and this ground is passed to the emitter of transistor Q10. This ground functions to terminate the operation of on-hook timing capacitor C1, as described hereinafter. Since transistor Q10 is presently turned ON its collector goes to ground and this ground is passed by way of diode CR4 to output lead 208, indicating to clamping circuit 204 that the incoming signal is outside the center frequency region.

If, during the off-hook condition, signals are received in the center frequency region, the potential on lead 109 goes positive. This turns transistor Q9 ON and the ground on its collector is passed to the base of transistor Q10. Since the emitter of transistor Q10 is connected to ground by way of the collector to emitter path of transistor Q11, transistor Q10 is immediately turned OFF and a positive potential is reapplied by resistor R8 to the base of transistor Q12 and to diode CR4. A positive potential is thereby reapplied to lead 208 by way of resistor R9. At the same time, with transistor Q12 turned OFF, the upper plate of capacitor C2 begins to discharge from its positive potential condition through resistor R10. Thus, it is seen that when the center frequency signal is received, lead 208 immediately goes positive and capacitor C2 begins to time.

If the incoming signal leaves the center frequency region prior to the timeout of capacitor C2, then the negative potential on lead 109 again turns transistor Q9 OFF. A positive potential is then reapplied through resistor R7 to the base of transistor Q10, which immediately turns ON. Ground is reapplied from the collector of transistor Q10 to lead 208 by way of diode CR4 and transistor Q12 is turned back ON to reapply the positive potential on its emitter to the upper plate of capacitor C2. Thus, when the data signal leaves the center frequency region, ground is reapplied to lead 208 and on-hook timing capacitor C2 is reset.

If it be assumed that the remote station has gone on-hook, then the supervisory signal will be continuously received for 15 milliseconds. As described above, during the reception of the supervisory signal transistor Q9 is turned ON and transistor Q10 is turned OFF, turning OFF, in turn, transistor Q12. After 15 milliseconds capacitor C2 discharges sufficiently to negative battery by way of resistor R10 to turn ON transistor Q19. Ground is, therefore, reapplied to lead 209, indicating the reestablishment of the on-hook condition. With ground on lead 209, supervisory output driver 205 reestablishes a negative potential on leads 202 and 210, as previously described. The negative potential on lead 210 turns OFF transistor Q11. This removes the ground from the emitter of transistor Q10 and, therefore, re-enables timing capacitor C1. On-off hook timers 203 again will time for the off-hook condition when a data signal outside the center frequency region is received.

Clamping circuit 204 includes transistors Q13, Q14 and Q15. The delayed data signal on lead 115 is applied to the base of transistor Q14. During normal data signaling, with the remote station off-hook and mark or space signals being received outside the center frequency region, lead 210 has a positive potential applied thereto and lead 208 is at ground. The ground on lead 208 is passed to the base of transistor Q13, turning this transistor ON. This provides a positive potential by way of the emitter to collector path of transistor Q13 to the emitter of transistor Q14. When a positive marking signal is on lead 115, transistor Q14 turns OFF. A negative potential is thus passed by way of resistor R13 to output lead 211. Conversely, when a negative spacing signal is applied to lead 115, transistor Q14 turns ON and the positive potential on its emitter is passed by way of its collector to output lead 211. Accordingly, during normal data signaling when the signals are outside the center frequency region, clamping circuit 204 accepts incoming data signals on lead 115 and passes them in an inverted form to output lead 211.

Assume now that the remote station is in the on-hook condition and lead 210 has therefore a negative potential applied thereto. This negative potential is passed by way of diode CR6 to the base of transistor Q15. Accordingly, transistor Q15 is turned OFF. At the same time, during the on-hook condition, lead 208 has a positive potential applied thereto. Accordingly, a positive potential is passed to the base of transistor Q13 and this latter transistor is turned OFF. With transistor Q13 turned OFF, the application of current to the emitter of transistor Q14 is terminated. Transistor Q14, therefore, cannot turn ON regardless of the signals applied to lead 115. Thus, during the on-hook condition, transistor Q14 is maintained OFF and a negative potential is applied by way of resistor R13 to lead 211 to clamp it in the negative marking condition. It is noted that during the off-hook condition the potential on lead 210 goes positive. This positive potential, however, is blocked from the base of transistor Q15 by diode CR6.

As previously described, clamping circuit 204 provides a clamping action when a positive potential is applied to lead 208, indicating that a signal in the center frequency is being received and a delayed marking signal is being applied to lead 115. With a marking signal being applied to lead 115 transistor Q14 is turned OFF, as previously described. A negative potential is thereby applied through resistor R13 to output lead 211, as previously described. This negative potential is also passed through resistor R14 to the base of transistor Q15. Accordingly, transistor Q15 is turned OFF and the positive potential on lead 208 turns OFF, in turn, transistor Q13. With transistor Q13 turned OFF, transistor Q14, in turn, is maintained OFF regardless of the signals on lead 115, to thereby provide the clamping action on output lead 211. It is noted, however, that when lead 208 goes positive if a spacing signal is being received and transistor Q14 is turned ON, the positive potential applied to output lead 211 is also passed through resistor R14 to the base of transistor Q15. Transistor Q15 is, therefore, turned ON, bringing the base of transistor Q13 down to ground and thus overcoming the positive potential applied to lead 208. Thus the clamping action cannot start until the delayed data signal on lead 115 is marking.

The clamping action of clamping circuit 204 in response to the signals received from the center frequency region is terminated when lead 208 returns to ground, indicating that data signals outside the center frequency region are once more being received. The ground on lead 208 is again passed to the base of transistor Q13, turning it ON. This reapplies ground to the emitter of transistor Q14 and the latter transistor can once again follow the signals on lead 115.

The data signals on lead 211 are passed to the bases of transistors Q16 and Q17 in data output driver 206. A negative marking signal on lead 211 turns ON transistor Q17 and its emitter follower action passes a negative signal to data output lead 201. Conversely, a positive spacing signal on lead 211 turns ON transistor Q16, which by emitter follower action passes a positive spacing signal to output lead 201. Lead 201 therefore follows the marking and spacing signals on lead 211.

Although a specific embodiment of this invention has been shown and described, it will be understood that various modifications may be made without departing from the spirit of this invention.

We claim:

1. In a receiver for incoming data signals which are in a first region and which normally enter into a second region for a limited interval, a signal path means for accepting the incoming signals and for applying the signals to utilization means, and means for squelching the application of signals by the signal path means to the utilization means while the incoming signals are in the second region, characterized in that the signal path means includes delay means for delaying the application of the signals after the acceptance thereof for a sufficient duration to permit termination of the squelching before the application of the limited interval second region signals to the utilization means, whereby second region signals are applied to the utilization means so long as the durations thereof do not exceed the limited interval.

2. In a receiver for data signals which normally fall below a predetermined signal threshold for limited intervals, a signal path means for applying the received data signals to utilizing means, and means responsive to the failure of said received signals to attain the predetermined signal threshold for precluding the application of the signals by the signal path means to the utilization means characterized in that the signal path means includes delay means for delaying the passage of data signals therethrough for a duration of time which is at least as long as the limited interval.

3. In a signaling system for binary data signals which are in an upper region when in one state, are in a lower region when in the other state and are in an intermediate region for a limited interval when the data signal changes from one state to another, a data receiver including a signal path means for accepting incoming signals and applying them to utilization means and means for squelching the application of signals by the signal path means when the incoming signals are in the intermediate region, said signal path means including means for delaying the application of signals after the acceptance thereof for a sufficient duration to permit the squelch to terminate before the application of the signal change to the utilization means.

4. In a signaling system in accordance with claim 3 wherein the duration of the delay of the delaying means is approximately the duration of the limited interval.

5. In a signalling system in accordance with claim 3 wherein the means for squelching includes clamping means effective during squelching for maintaining the applied signals in the one state.

6. In a signaling system in accordance with claim 5 wherein the clamping means is rendered effective when the delayed signal is in the one state whereby, during squelching, the applied signal state cannot change from the one state to the other state.

7. In a signaling system in accordance with claim 3 wherein a continuous signal in the intermediate region comprises a supervisory signal separate and distinct from the binary data signals, said receiver further including means for detecting the continuous intermediate region signal to indicate reception of the supervisory signal.

8. In a signaling system in accordance with claim 7 wherein the binary data signals and supervisory signals are frequency shift signals, the binary data signals in the one state comprising a signal frequency in an upper frequency region, the binary data signal in the other state comprising a signal frequency in a lower frequency region and the supervisory signal comprising a signal frequency in an intermediate frequency region, the binary data signals changing from one state to another by sweeping the signal frequency through the intermediate frequency region.

9. In a signaling system in accordance with claim 3 wherein the data receiver further includes means for receiving the binary data signals and developing a signal having an amplitude higher than an upper threshold when the one state is received and developing a signal having an amplitude lower than a lower threshold when the other state is received and the squelching means includes means for rendering the squelching means operative while the developed signal amplitude fails to be higher than the upper threshold and lower than the lower threshold.

10. In a signaling system in accordance with claim 9 wherein the squelching means further includes timing means for locking the squelching means in the operative state in response to the failure of the developed signal amplitude to be higher than the upper threshold and lower than the lower threshold for a predetermined duration of time substantially greater than the limited interval.

11. In a signaling system in accordance with claim 10 wherein the locked squelching means is unlocked in response to a continuous developed signal amplitude higher than the upper threshold or lower than the lower threshold.

12. In a signaling system in accordance with claim 9 wherein the signal path means includes a data slicer for slicing the developed signals, said data slicer having a slicing crossover level at an amplitude intermediate to the upper threshold and the lower threshold to produce signal transitions as the signals cross the slicing level.

13. In a signaling system in accordance with claim 12 wherein the delaying means delays the application of the signal transitions produced by the data slicer.